United States Patent [19]
Kimura et al.

[11] Patent Number: 6,062,824
[45] Date of Patent: May 16, 2000

[54] CONTROL VALVE

[75] Inventors: Kazuya Kimura; Kiyohiro Yamada; Yuji Kaneshige, all of Kariya; Ichiro Hirata, Fujisawa; Shuji Fukunaga, Fujisawa; Kouji Watanabe, Fujisawa; Norio Uemura, Fujisawa, all of Japan

[73] Assignees: Kabushiki Kaisha Toyoda Jidoshokki Seisakusho, Aichi-ken; NOK Corporation, Tokyo, both of Japan

[21] Appl. No.: 09/299,491

[22] Filed: Apr. 26, 1999

[30]     Foreign Application Priority Data

Jul. 24, 1998  [JP]  Japan ................................. 10-117128
Apr. 22, 1999  [JP]  Japan ................................. 11-114529

[51] Int. Cl.[7] ..................................................... F04B 1/26
[52] U.S. Cl. ................................. 417/222.2; 251/129.02; 251/129.15
[58] Field of Search .................... 417/222.2; 251/129.02, 251/129.15, 61.5; 335/255; 439/607, 608, 609, 610

[56]                   References Cited
                  U.S. PATENT DOCUMENTS

| 5,145,326 | 9/1992  | Kimura et al. ........................ 417/222.2 |
| 5,584,670 | 12/1996 | Kawaguchi et al. .................. 417/222.2 |
| 5,702,235 | 12/1997 | Hirota et al. ......................... 417/222.2 |
| 5,890,876 | 4/1999  | Suito et al. ........................... 417/222.2 |
| 5,964,578 | 10/1999 | Suito et al. ........................... 417/222.2 |

FOREIGN PATENT DOCUMENTS 9-268973  10/1997  Japan .

*Primary Examiner*—Charles G. Freay
*Attorney, Agent, or Firm*—Morgan & Finnegan, L.L.P.

[57]                     ABSTRACT

A displacement control valve included in a variable displacement compressor. The compressor includes a fluid passage for connecting a crank chamber to a discharge chamber. The control valve includes a valve chamber connected to the crank chamber through the fluid passage, a valve hole connected to the discharge chamber through the fluid passage, and a valve body located in the valve chamber. A bellows influences the valve body through a pressure sensitive rod in accordance with suction pressure. A solenoid includes a fixed iron core and a plunger arranged in a plunger chamber. The plunger urges the valve body through a solenoid rod by a force determined by the level of electric current supplied to the solenoid. The fixed iron core, which is located between the valve chamber and the plunger chamber, includes a guide hole for receiving the solenoid rod. An annular passage for connecting the valve chamber to the plunger chamber is formed between the guide hole and the solenoid rod. Accordingly, the pressure of the crank chamber is applied to the plunger chamber through the valve chamber and the annular passage. In this control valve, the valve body has desirable operating characteristics without relying on parts having precise dimensions.

20 Claims, 8 Drawing Sheets

CONTROL VALVE

BACKGROUND OF THE INVENTION

The present invention relates to a control valve of a variable displacement compressor used for vehicle air conditioning systems.

Generally, variable displacement compressors include a displacement control valve, which is located in a control passage for connecting the discharge chamber to the crank chamber. The displacement control valve controls the opening size of the control passage. This changes the amount of high-pressure refrigerant gas supplied from the discharge chamber to the crank chamber and adjusts the pressure in the crank chamber. The difference between the pressure in the crank chamber and the pressure in the cylinder bore changes when the pressure in the crank chamber changes. The inclination angle of a swash plate is varied in accordance with this pressure difference, which varies the displacement amount.

Japanese Unexamined Patent Publication No. 9-268973 describes a displacement control valve used for a variable displacement compressor. As shown in FIG. 7, a valve chamber 101 is formed substantially in the center of the control valve. The valve chamber 101 is connected to a crank chamber 121 through a valve hole 102 and the downstream side of a control passage 120. The valve chamber 101 is also connected to the discharge chamber 123 through the upstream side of the control passage 120. A valve body 103 is accommodated in the valve chamber 101 and opens and closes the valve hole 102. An opener spring 104 urges the valve body 103 to open the valve hole 102.

A pressure sensitive chamber 105 is connected to a suction pressure zone 125. A bellows 106 is accommodated in the pressure sensitive chamber 105. A bellows spring 107 is arranged in the bellows 106. The bellows spring 107 sets the initial length of the bellows 106. The distal end of a pressure sensitive rod 108, which extends from the valve body 103, engages the bellows 106. The pressure sensitive chamber 105 is exposed to the suction pressure Ps. Therefore, when the suction pressure Ps increases, the bellows contracts. Then, the valve body 103 is moved axially to close the valve hole 102 through the pressure sensitive rod 108. When the suction pressure Ps in the suction zone 125 decreases, the bellows expands, and the valve body 103 is moved to open the valve hole 102 through the pressure sensitive rod 108.

A fixed iron core 110 is axially adjacent to the valve chamber 101. A plunger chamber 109 is axially adjacent to the iron core 110, such that the iron core 110 separates the plunger chamber 109 from the valve chamber 101. A movable iron core 111 is accommodated in the plunger chamber 109. A follower spring 112 is located between the movable core 111 and the inner bottom of the plunger chamber 109. A rod guide hole 113 is formed between the plunger chamber 109 and the valve chamber 101 to pass through the fixed core 110. A solenoid rod 114, which extends from the valve body 103, is inserted in the guide hole 113. The distal end of the solenoid rod 114 is urged against the movable core 111 by the force of the opener spring 104 and the follower spring 112. Accordingly, the movable core 111 and the valve body 103 move together through the solenoid rod 114.

Electromagnetic attraction force between the cores 110, 111 varies in accordance with the electric current supplied to a coil 115. The movable core 111 urges the valve body 103 toward the closing position with a force determined by the electromagnetic attraction through the solenoid rod 114. Accordingly, the amount of suction pressure required to close the valve changes in accordance with the level of current delivered to the coil 115.

The pressure of a discharge chamber 123 (discharge pressure Pd) is applied to the valve chamber 101 through a control passage 120. Accordingly, the valve body 103 is exposed to the relatively high discharge pressure Pd. Also, the cross sectional area of the solenoid rod 114 is equal to that of the valve hole 102. Therefore, the force of the discharge pressure Pd that urges the valve body 103 to the closing position is equal to the force of the discharge pressure Pd that urges the valve body 103 to its opening position. Therefore, the influence of the discharge pressure Pd to the valve body 103 is negated.

The pressure Pc in the crank chamber 121 is applied to the valve hole 102 through the control passage 120. The crank pressure Pc is further applied to the plunger chamber 109 through a small chamber 116c, a plunger passage 116b and a plunger groove 116a. Accordingly, the pressure in the plunger chamber 109 is equal to the crank pressure, which is the same as the pressure in the valve hole 102. The plunger passage 116b and the plunger groove 116a are formed in the control valve. The small chamber 116c is formed between a housing of the compressor and the control valve, which is installed in the compressor housing.

The crank pressure Pc in the valve hole 102 urges the valve body 103 toward its open position. The crank pressure Pc in the plunger chamber 109 urges the valve body 103 toward its closed position through the solenoid rod 114. Therefore, the force of the crank pressure Pc opening the valve body is substantially equal to the force of the crank pressure Pc closing the valve body 103. Thus, the crank pressure Pc has little influence on the valve body 103.

In the control valve of FIG. 7, the influence of the discharge pressure Pd and the crank pressure Pc is substantially nil. Therefore, there is no need to increase electromagnetic attraction force between the fixed core 110 and the movable core 111 to move the valve body 103 against the forces of the discharge pressure Pd and the crank pressure Pc. Furthermore, the valve body 103 sensitively reacts to the movement of the bellows 106 in accordance with the changes of the suction pressure Ps. Accordingly, even if the value of electric current supplied to the coil 115 is small or the change of the suction pressure Ps is slight, the opening size of the valve hole 102 is precisely controlled by the valve body 103.

The forces applied to the control valve of FIG. 7 will now be described with reference to FIG. 8. The forces applied on the valve body 103 are represented by the following expression (11).

$$f_0 - S_1 * Ps - S_2(Pc - Ps) = S_3(Pd - Pc) - S_4(Pd - Px) + \quad (11)$$
$$F + f_2 - f_1$$
$$= Pd(S_3 - S_4) - S_3 * Pc + S_4 * Px +$$
$$F + f_2 - f_1$$

$S_1$ represents the pressurized area of the bellows 106.

$S_2$ represents the cross sectional area of the pressure sensitive rod 108.

$S_3$ represents the cross sectional area of the valve hole 102.

$S_4$ represents tho cross sectional area of the solenoid rod 114.

F represents the electromagnetic attraction force generated by the passage of electricity in the coil 115.

$f_0$ represents the force of the bellows spring 107 and the force of the bellows 106.

$f_1$ represents the force of the opener spring 104.

$f_2$ represents the force of the follower spring 112.

Ps represents the suction pressure (pressure in the pressure sensitive chamber 105).

Pc represents the crank pressure (pressure in the valve hole 102).

Pd represents the discharge pressure (pressure in the valve chamber 101).

Px represents the pressure in the plunger chamber 109.

As shown above, the cross sectional area $S_4$ of the solenoid rod 114 is equal to the cross sectional area $S_3$ of the valve hole 102. Further, the pressure Px in the plunger chamber 109 is equal to the pressure in the valve hole 102, which is equal to the crank pressure Pc. Accordingly, since $Pd(S_3-S_4)=0$ and $-S_3*PC+S_4*Px=0$ in the right side of the equation (11), the following expression (12) is obtained.

$$f_0-S_1*Ps-S_2(Pc-Ps)=F+f_2-f_1$$
$$Ps=(f_0+f_1-f_2-F-S_2*Pc)/(S_1-S_2) \quad (12)$$

The expression (12) indicates that the influence of the discharge pressure Pd on the valve body 103 is nil and that the influence of the crank pressure Pc on the valve body 103 is small.

However the control valve of FIG. 7 has the following problem.

The valve chamber 101 is exposed to the discharge pressure Pd, and the plunger chamber 109 is exposed to the crank pressure Pc. When gas from the valve chamber 101 leaks to the plunger chamber 109 through the space between the solenoid rod 114 and the rod guide 113, the pressure Px in the plunger chamber 109 becomes higher than the crank pressure Pc. Then, in the expression (11), $-S_3*Pc+S_4*Px$ is greater than zero. Therefore, the force required to move the valve body 103 to its closed position increases. Therefore, the movement of the valve body 103 to the opening position is hindered, which prevents optimal operation of the valve body 103 in accordance with the changes of electric current supplied to the coil 115 and the changes of the suction pressure Ps.

Accordingly, it is necessary to seal the space between the solenoid rod 114 and the rod guide hole 113 to prevent leakage of gas from the valve chamber 101 to the plunger chamber 109. This requires that the solenoid rod 114 and the guide hole 113 be manufactured with high precision, thus increasing the manufacturing costs.

Also, the passage 116 must be formed in the control valve to introduce the crank pressure Pc to the plunger chamber 109. This also increases the manufacturing costs.

SUMMARY OF THE INVENTION

The first objective of the present invention is to provide a control valve having a valve body that operates desirably without too much dependence on precision of the parts.

The second objective of the present invention is to provide a control valve having a simpler structure.

To achieve the above objectives, the present invention provides a control valve for adjusting the amount of fluid that flows from high-pressure zone to a pressurized chamber through a fluid passage in accordance with an operating pressure applied to the control valve. The control valve is structured as follows. A housing includes a valve hole and a valve chamber, which are located in the fluid passage. The valve hole communicates with the valve chamber when the valve is open. A movable valve body is located in the valve chamber to face the valve hole. A reacting member reacts to the operating pressure. A first rod is located between the reacting member and the valve body for transmitting motion from the reacting member to the valve body. A solenoid is located on the opposite side of the valve body from the reacting member. The solenoid includes a plunger chamber and a movable plunger located in the plunger chamber. A second rod is located between the plunger and the valve body. The plunger urges the valve body in one direction through the second rod in accordance with electric current supplied to the solenoid. The valve chamber and the plunger chamber are exposed to the pressure of one of the high-pressure zone and the pressurized chamber, and the valve hole is exposed to the pressure of the other.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A variable displacement compressor control valve according to an embodiment of the present invention will now be described with reference to FIGS. 1 to 5.

Figure 2:
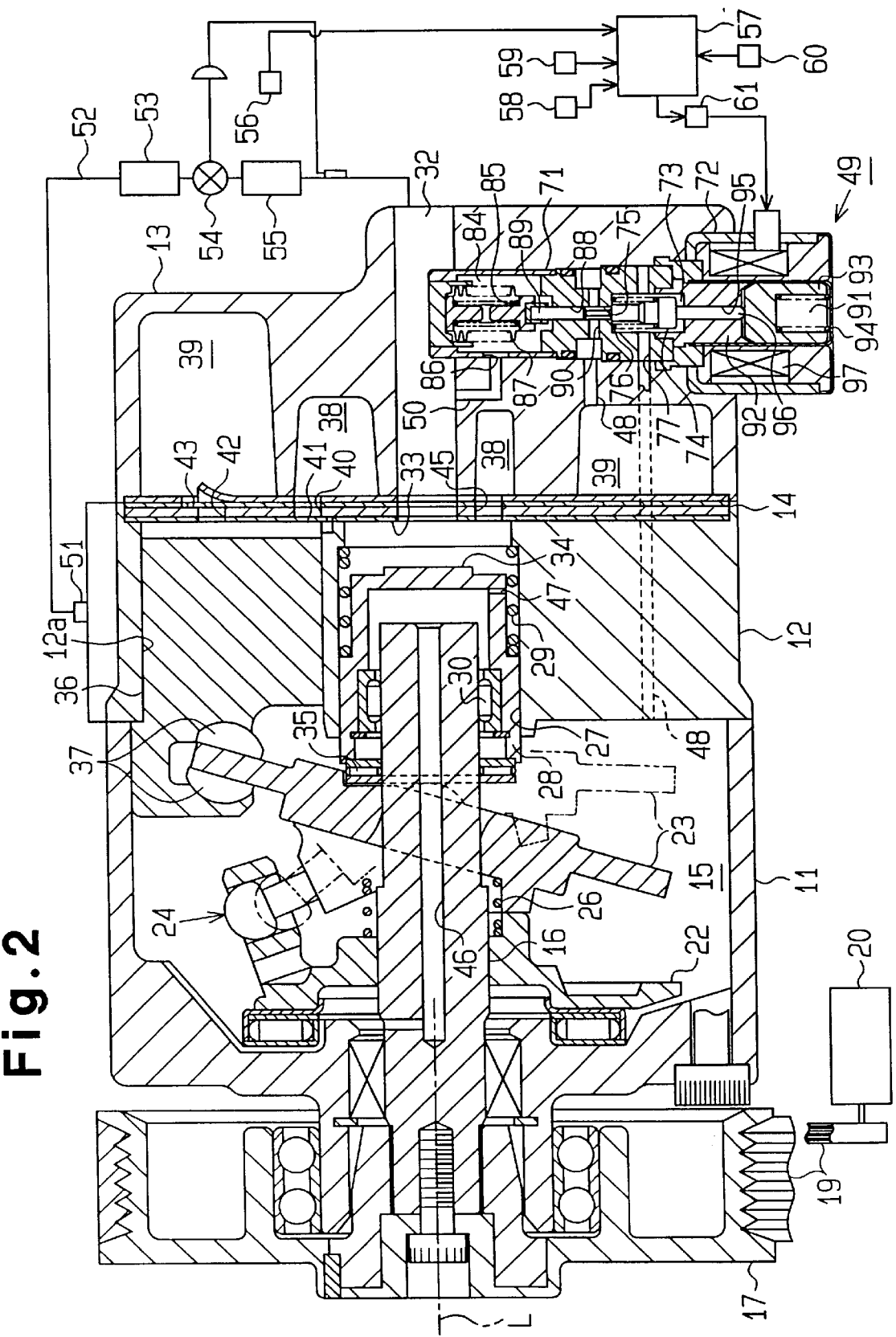
FIG. 2 is a cross sectional view illustrating a variable displacement compressor including the control valve of FIG. 1.

Firstly, the structure of the variable displacement compressor will be described. As shown in FIG. 2, a front housing 11 is secured to the front end face of a cylinder block 12. A rear housing 13 is secured to the rear end face of the cylinder block 12 with a valve plate 14. A crank chamber 15 is defined by the front housing 11 and the cylinder block 12. A drive shaft 16 is rotatably supported in the front housing 11 and the cylinder block 12 to go through the crank chamber 15.

A pulley 17 is rotatably supported in the front end of the front housing 11. The pulley 17 is coupled to the drive shaft 16. The pulley 17 is directly connected to an external drive source (engine 20) by a belt 19. That is, the compressor according to the present embodiment is a clutchless type variable displacement compressor, which lacks a clutch between the drive shaft 16 and the external drive source.

A rotor 22 is fixed to the drive shaft 16 in the crank chamber 15. A swash plate 23, or a drive plate is supported by the drive shaft 16 to slide along the surface of the drive shaft 16 and to incline with respect to the axis L of the drive shaft 16. A hinge mechanism 24 is located between the rotor 22 and the swash plate 23. The hinge mechanism 24 integrally rotates the swash plate 23 with the drive shaft 16 and the rotor 22. The hinge mechanism 24 permits the swash plate 23 to move along the surface of the drive shaft 16 and to incline. The swash plate 23 moves toward the cylinder block 12 by reducing its inclination angle. An inclination reducing spring 26 is located between the rotor 22 and the swash plate 23. The spring 22 urges the swash plate 23 to reduce its inclination. The swash plate 23 is positioned at its maximum inclination position by abutting against the rotor 22.

Figure 3:
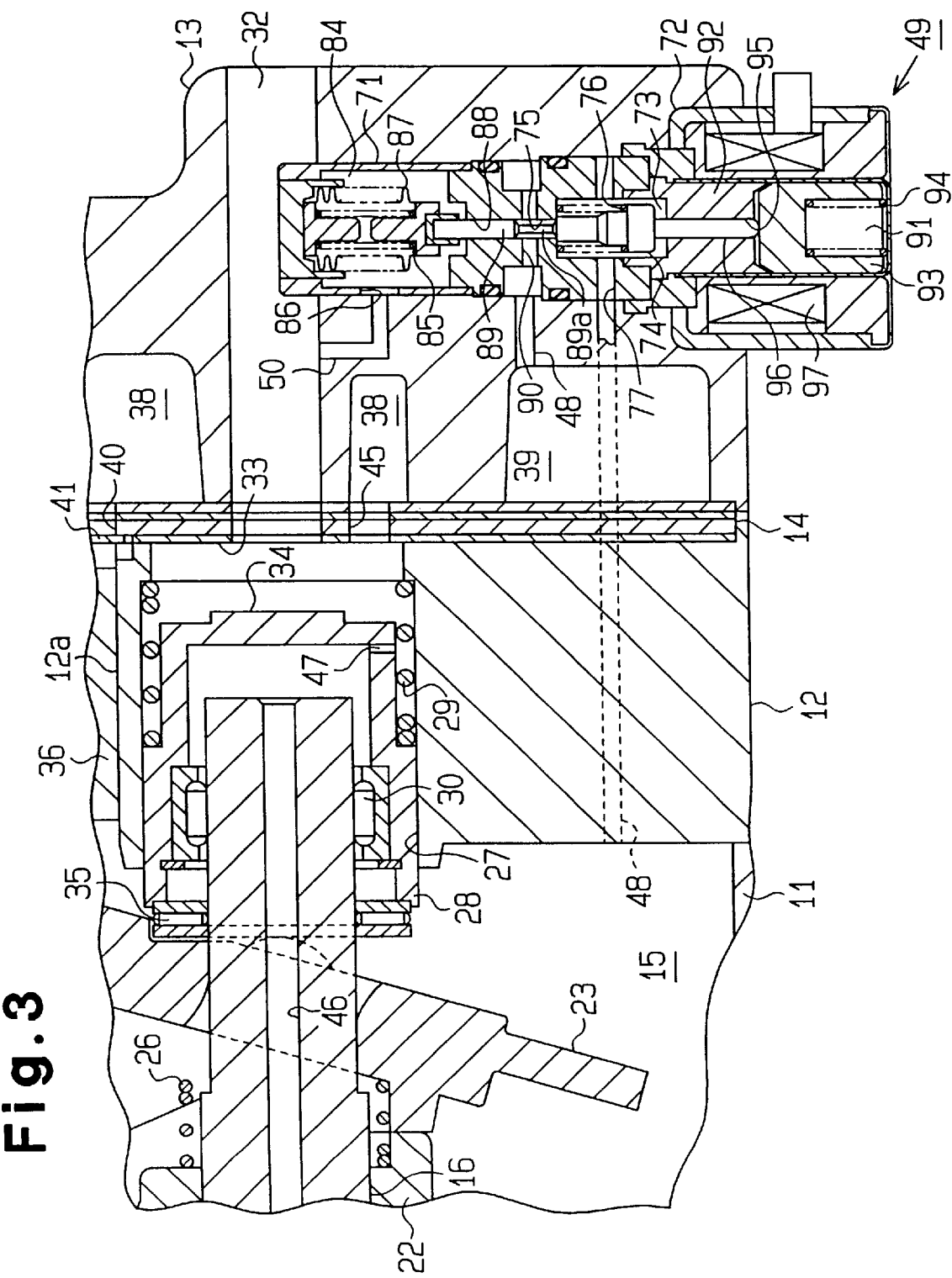
FIG. 3 is an enlarged partial cross sectional view illustrating the compressor of FIG. 2 when the inclination of the swash plate is maximum.

As shown in FIG. 3, a shutter chamber 27 is defined at the center of the cylinder block 12 to extend along the axis L of the drive shaft 16. A hollow cylindrical shutter 28 having a closed end is slidably accommodated in the shutter chamber 27. A coil spring 29 is located between a step on the inner surface of the shutter chamber 27 and a step on the outer surface of the shutter 28 and urges the shutter 28 toward the swash plate 23.

The rear end of the drive shaft 16 is received in the shutter 28. A radial bearing 30 is located between the rear end of the drive shaft 16 and the inner surface of the shutter 28 and is slidable with respect to the drive shaft 16 with the shutter 28 along the axis L.

A suction passage 32, which forms a suction pressure area, is formed at the center of the rear housing 13 and the valve plate 14. The inner end of the suction passage 32 is connected to the shutter chamber 27. A positioning surface 33 is formed on the valve plate 14 around the inner end opening of the suction passage 32. A shutter surface 34 is formed on the end surface of the shutter 28. The shutter surface 34 abuts against the positioning surface 33. This limits the rearward (rightward in FIG. 2) movement of the shutter 28 and disconnects the suction passage 32 from the shutter chamber 27.

Figure 4:
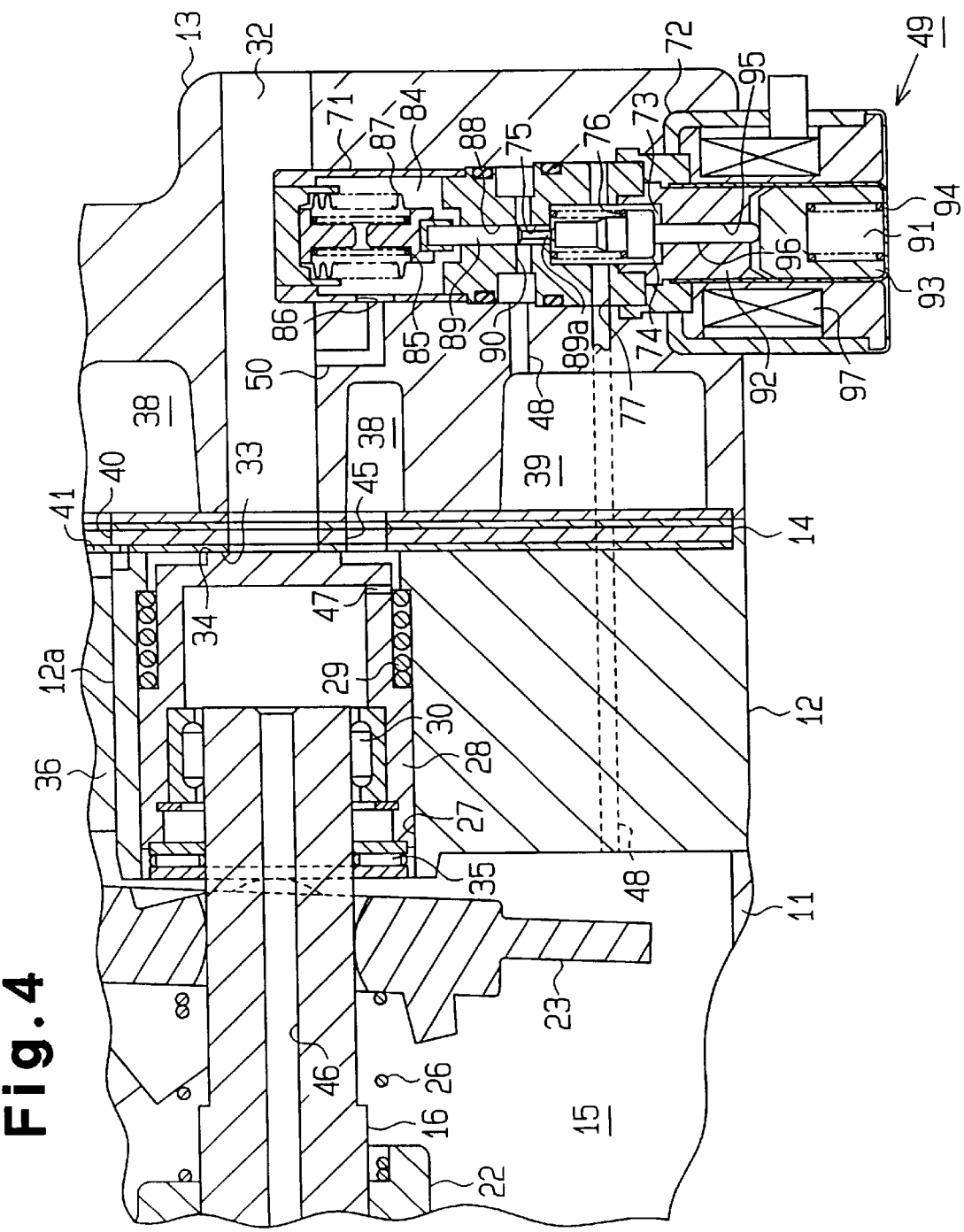
FIG. 4 is an enlarged partial cross sectional view illustrating the compressor of FIG. 2 when the inclination of the swash plate is minimum.

A thrust bearing 35 is located between the swash plate 23 and the shutter 28 and is slidably supported on the drive shaft 16. The thrust bearing 35 is held between the swash plate 23 and the shutter 28 by the force of the opener spring 29. As the inclination angle of the swash plate decreases, the swash plate 23 moves rearward. This moves the shutter 28 rearward through the thrust bearing 35. Therefore, the shutter 28 moves toward the positioning surface 33 against the force of the opener spring 29. As shown in FIG. 4, when the shutter surface 34 of the shutter 28 abuts against the positioning surface 33, the shutter 28 disconnects the suction passage 32 from the shutter chamber 27, and the swash plate 23 is positioned at the minimum inclination angle position. The angle of the swash plate 23 is defined as zero degrees when the swash plate 23 is arranged in a plane perpendicular to the axis L of the drive shaft 16, and the minimum inclination angle of the swash plate 23 is slightly greater than zero degrees.

As shown in FIG. 2, cylinder bores 12a (only one shown) are formed in the cylinder block 12 to surround the drive shaft 16. A single head piston 36 is accommodated in each cylinder bore 12a. Each piston 36 is coupled to the periphery of the swash plate 23 through a pair of shoes 37. The swash plate 23 converts the rotation of the drive shaft 16 into reciprocation of each piston 36.

A suction chamber 38 (suction pressure zone) and a discharge chamber 39 (discharge pressure zone) are respectively defined in the rear housing 13. A suction port 40, a suction valve 41, a discharge port 42 and a discharge valve 43 are formed in the valve plate 14 to correspond to each cylinder bore 12a. When the piston moves from the top dead center to the bottom dead center, refrigerant in the suction chamber 38 is drawn to the cylinder bore 12a from the suction port 40 through the suction valve 41. When the piston 36 moves from the bottom dead center to the top dead center, refrigerant in the cylinder bore 12a is compressed to reach a predetermined pressure and is discharged to the discharge chamber 39 from the discharge port 42 through the discharge valve 43.

The suction chamber 38 is connected to the shutter chamber 27 through a passage 45, which is formed in the valve plate 14. When the shutting surface 34 of the shutter 28 contacts the positioning surface 33, the passage 45 is disconnected from the suction passage 32. An axial passage 46 is formed in the drive shaft 16. The axial passage 46 connects the crank chamber 15 to the inside of the shutter 28. A pressure release aperture 47 is formed in the peripheral surface of the shutter 28. The release aperture 47 connects the inner space of the shutter 28 to the inner space of the shutter chamber 27.

A control passage 48 connects the discharge chamber 39 to the crank chamber 15. A displacement control valve 49 is installed in the rear housing 13 and is located in the control passage 48. A pressure detection passage 50 is formed in the rear housing 13 to apply the pressure in the suction passage to the control valve 49.

An outlet port 51 is formed in the cylinder block 12 and is connected to the discharge chamber 38. An external refrigerant circuit 52 connects the outlet port 51 to the suction passage 32. The refrigerant circuit 52 includes a condenser 53, an expansion valve,54 and an evaporator 55. A temperature sensor 56 is located near the evaporator 55. The temperature sensor 56 detects the temperature of the evaporator 55 and sends signals based on the detected value to the computer 57. The computer 57 is connected to a temperature adjuster 58, the temperature sensor 59 and an air conditioner switch 60. A target temperature of the driver's compartment is set by the temperature adjuster 58.

The computer 57 instructs a driving circuit 61 to supply a certain current level based on a temperature set by the temperature adjuster 58, a detected temperature from the temperature sensor 59, and the on/off state of the air conditioner switch 60. The driving circuit 61 outputs the instructed current value to the control valve 49. The conditions for determining the current value to the control valve 49 may include the temperature outside the compartment, the rotational speed of the engine 20 or other conditions.

Figure 1:
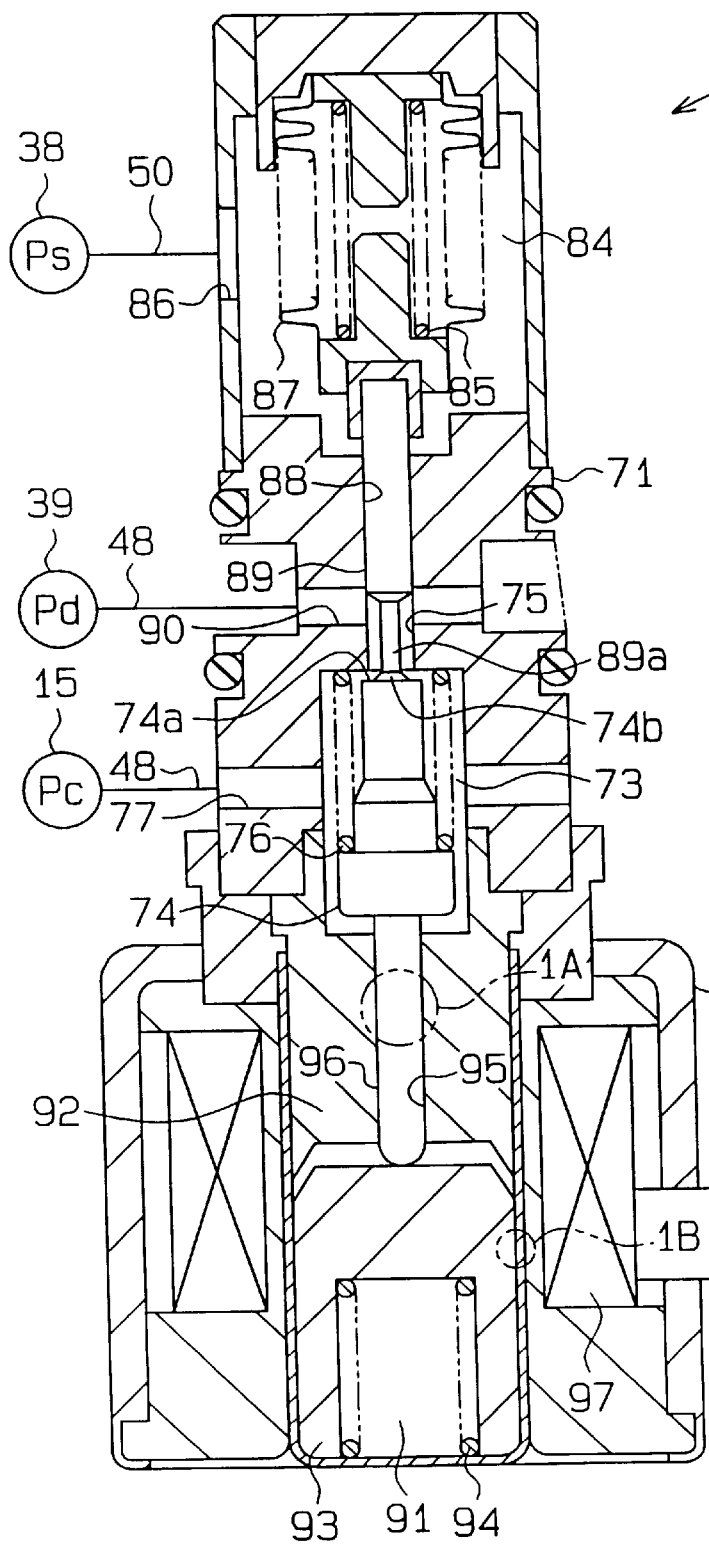
FIG. 1 is a cross sectional view illustrating a control valve according to a first embodiment of the present invention.

The structure of the control valve 49 will now be described. As shown in FIG. 1, the control valve 49 includes a valve housing 71 and a solenoid 72, which are joined together. A valve chamber 73 is formed between the valve housing 71 and the solenoid 72. The valve chamber 73 is connected to the crank chamber 15 through a port 77 and the downstream side of the control passage 48. A valve body 74 is accommodated in the valve chamber 73. A valve hole 75 extends axially in the housing 71 and is open to the inner end surface of the valve chamber 73. The periphery of the valve hole 75 makes a valve seat, which is contacted by the shutter surface 74a of the valve body 74. A spring 76 is arranged between the valve body 74 and the inner end surface of the valve chamber 73.

A pressure sensitive chamber 84 is formed in the distal end of the housing 71. The pressure sensitive chamber 84 is connected to the suction passage 32 through a pressure detection port 86 and the pressure detection passage 50. Bellows 87 are arranged in the pressure sensitive chamber 84. The bellows 87 form a pressure reacting member, which reacts to the suction pressure Ps applied to the pressure sensitive chamber 84 from the suction passage 32 through the pressure detection passage 50. A bellows spring 85 is located in the bellows 87. The space inside the bellows 87 is depressurized to a near-vacuum. Therefore, the bellows spring 85 prevents the bellows 87 from being contracted by the atmosphere and determines the initial length of the bellows 87. The elastic forces of the bellows 87 and the bellows spring 85 urge the valve body 74 to open through a pressure sensitive rod 89.

A rod guide hole 88 is formed in the valve housing 71 in alignment with the valve hole 75, between the pressure sensitive chamber 84 and the valve hole 75. The guide hole 88 has substantially the same diameter as that of the valve hole 75. The pressure sensitive rod 89, or a first rod is received in the guide hole 88 with enough clearance to permit the rod 89 to slide. The distal end of the pressure sensitive rod 89 is engaged with the end of bellows 87. The proximal end of the pressure sensitive rod 89 is integrally joined to a tapered portion 74b, which is integrally joined to the valve body 74. The pressure sensitive rod 89 connects the bellows 87 and the valve body 74. The pressure sensitive rod 89 includes a small-diameter portion 89a, which extends axially in the valve hole 75. A space for permitting passage of refrigerant is provided between the small-diameter portion 89a and the valve hole 75. The cross sectional area of the pressure sensitive rod 89 is equal to the cross sectional area of the valve hole 75.

The inlet port 90 is formed between the valve chamber 73 and the pressure sensitive chamber 84 in the valve housing 71 to be connected to the valve hole 75. The valve hole 75 is connected to the discharge chamber 39 through the inlet port 90 and the upstream of the control passage 48. The outlet port 77, the valve chamber 73, the valve hole 75 and the inlet port 90 form part of the control passage 48.

A plunger chamber 91 is formed in the solenoid 72. A fixed iron core 92 is engaged with the upper portion of the solenoid 72 and separates the plunger chamber 91 from the valve chamber 73. The plunger, or a movable iron core 93 is accommodated in the plunger chamber 91 to axially reciprocate. A follower spring 94 is located between the movable iron core 93 and the inner bottom surface of the plunger chamber 91.

A rod guide hole 95 is formed in the fixed iron core 92 between the plunger chamber 91 and the valve chamber 73. A solenoid rod 96, or a second rod is integrally formed with the valve body 74 and is received in the guide hole 95 with enough clearance to permit the rod 96 to slide. The distal end of the solenoid rod 96 is urged by the opener spring 76 and the follower spring 94 to contact the movable iron core 93. Accordingly, the movable iron core 93 moves integrally with the valve body 74 through the solenoid rod 96.

Figure 1A:
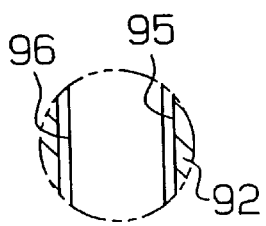
FIG. 1A is an enlarged cross sectional view of the part shown by the circle 1A in FIG. 1.
Figure 1B:
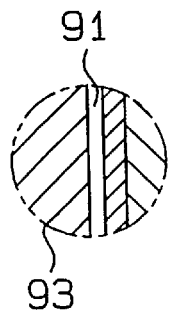
FIG. 1B is an enlarged cross sectional view of the part shown by the circle 1B in FIG. 1.

As shown in FIG. 1A, a small space exists between the inner surface of the guide hole 95 and the outer surface of the solenoid rod 96. The plunger chamber 91 is connected to the valve chamber 73 through this space. The valve chamber 73 is connected to the crank chamber 15 through the downstream portion of the control passage 48. The pressure in the crank chamber 15 (crank pressure Pc) is applied to the valve chamber 73. Accordingly, the plunger chamber 91 is under the same pressure as the valve chamber 73. Both the plunger chamber 91 and the valve chamber 73 are exposed to the crank pressure. As shown in FIG. 1B, a small space exists between the inner surface of the plunger chamber 91 and the outer surface of the movable iron core 93. Accordingly, the space above the movable iron core 93 and the space below the movable iron core 93 are connected in the plunger chamber 91.

A ring-like coil 97 is located around the fixed iron core 92 and the movable iron core 93. A predetermined value of electric current is supplied to the coil 97 from the driving circuit 61, as determined by the control computer 57.

The operation of the compressor will now be described.

If the temperature detected by the temperature sensor 59 while the operation switch is on is greater than the value set by the temperature adjuster 58, the computer 57 instructs the driving circuit 61 to excite the solenoid 72. Then, a predetermined level of electric current is supplied to the coil 97 through the driving circuit 61. When the current is supplied to the coil 97, electromagnetic attraction force in accordance with the value of the supplied current is generated between the iron cores 92, 93. The electromagnetic attraction force is transmitted to the valve body 74 through the solenoid rod 96. Accordingly, the valve body 74 is urged to close the valve hole 75 against the force of the opener spring 76.

On the other hand, the bellows 87 expand and contract axially in accordance with the suction pressure Ps applied to the pressure sensitive chamber 84 from the suction passage 32 through the pressure detection passage 50. The axial movement of the bellows 87 is transmitted to the valve body 74 through the pressure sensitive rod 89. Accordingly, the opening amount of the valve hole 75 by the valve body 74 is determined by the equilibrium of forces applied on the valve body 74, which are essentially the force from the solenoid 72 (including the force of the follower spring 94), the force from the bellows 87 (including the force of the bellows spring 85), and the force of the opener spring 76.

When cooling load is great, the difference between the temperature detected by the temperature sensor 59 and the temperature set by the temperature adjuster 58 is greater. The computer 57 thus instructs the driving circuit 61 to increase the level of current sent to the coil 97. Therefore, the attraction force between the fixed iron core 92 and the movable iron core 93 increases, and the force that closes the valve hole 75 increases. Accordingly, the suction pressure required to close the valve hole 75 is set to be relatively low. Therefore, the control valve 49 maintains a lower suction pressure (corresponding to a target value) when the level of the electric current increases.

As the opening of the valve decreases, the amount of refrigerant gas supplied to the crank chamber 15 from the discharge chamber 39 through the control passage 48 is reduced. On the other hand, the refrigerant gas in the crank chamber 15 flows to the suction chamber 38 through the axial passage 46, the pressure release passage 47, the shutter chamber 27, and the passage 45. Therefore, the pressure in the crank chamber 15 is reduced. Since the suction pressure Ps is greater when the cooling load is greater, the pressure in the cylinder bore 12a is increased. Accordingly, the difference between the pressure in the crank chamber 15 and the pressure in the cylinder bore 12s is reduced, and the inclination angle of the swash plate 23 increases. This increases the displacement of the compressor.

When the valve hole 75 is completely closed by the valve body 74, the control passage 48 is closed, and the supply of high pressure refrigerant gas from the discharge chamber 39 to the crank chamber 15 is stopped. Accordingly, the pressure in the crank chamber 15 becomes substantially equal to the relatively low pressure in the suction chamber 38. Accordingly, as shown in FIGS. 2 and 3, the inclination angle of the swash plate 23 becomes maximum, and the displacement of the compressor is maximum.

When the cooling load is small, the difference between the temperature detected by the temperature sensor 59 and the temperature set by the temperature adjuster 58 is small. Thus, the computer 57 reduces the level of the electric current sent by the driving circuit 61 to the coil 97. Therefore, the attraction force between the fixed iron core 92 and the movable iron core 93 is reduced and the force urging the valve body 74 to close the valve hole 75 is reduced. Accordingly, the suction pressure required to close the valve hole 75 is set to be relatively high. Therefore, the control valve 49 maintains a higher suction pressure (corresponding to a target value) when the value of the electric current is reduced.

When the opening size of the valve hole 75 is increased, the amount of refrigerant supplied from the discharge chamber 39 to the crank chamber 15 is increased and the pressure in the crank chamber 15 is increased. Also, since the suction pressure Ps is relatively low when the cooling load is small, the pressure in each cylinder bore 12a is also reduced. Accordingly, the difference between the pressure in the crank chamber 15 and the pressure in the cylinder bores 12a is increased and the inclination angle of the swash plate 23 is reduced. This reduces the displacement of the compressor.

When cooling load is close to zero, the temperature of the evaporator in the external refrigerant circuit 52 approaches a temperature low enough to produce frost. When the temperature detected by the temperature sensor 56 is below the frost-forming temperature, the computer 57 reduces to zero the electric current produced by the driving circuit 61. Accordingly, the driving circuit 61 stops the supply of the electric current to the coil 97. As a result, an attraction force is not generated between the fixed iron core 92 and the movable iron core 93.

This causes the valve body 74 to open the valve hole 75 against the force of the follower spring 94, which is applied through the movable iron core 93 and the solenoid rod 96. As a result, the valve body 74 is positioned to maximize the opening size of the valve hole 75. Accordingly, the amount of refrigerant gas supplied from the discharge chamber 39 to the crank chamber 15 is increased, which increases the pressure in the crank chamber 15. Therefore, as shown in FIG. 4, the inclination angle of the swash plate 23 is minimized. This minimizes the displacement of the compressor.

When the operation switch is turned off, the computer 57 instructs the driving circuit 61 to demagnetize the solenoid 72. This minimizes the inclination angle of the swash plate 23.

As described above, the valve body 74 of the control valve 49 closes the valve hole 75 at a lower suction pressures when the electric current supplied to the coil 97 increases. The valve body 74 closes the valve hole 75 at higher suction pressures as the supplied electric current decreases. The compressor adjusts its displacement by controlling the inclination angle of the swash plate 23 to maintain the suction pressure at a target value. Accordingly, the control valve 49 changes a target suction pressure value in accordance with the level of the supplied electric current. A compressor having this kind of control valve 49 changes the cooling capacity of the air conditioner.

When the inclination angle of the swash plate 23 is minimized, the shutter surface 34 of the shutter 28 contacts the positioning surface 33. This limits the swash plate 23 to the minimum inclination angle and disconnects the suction passage 32 from the suction chamber 38. Accordingly, the flow of refrigerant gas from the external refrigerant circuit 52 to the suction chamber 38 is stopped, and the circulation of the refrigerant gas through the refrigerant circuit 52 and the compressor is cut.

The minimum inclination angle of the swash plate 23 is slightly greater than zero degrees. Therefore, even if the inclination angle of the swash plate is minimized, refrigerant gas is discharged from the cylinder bore 12a to the discharge chamber 39. This minimizes the displacement of the compressor. The refrigerant gas discharged from the cylinder bore 12a to the discharge chamber 39 flows to the crank chamber 15 through the control passage 48. Refrigerant gas in the crank chamber 15 flows back to the cylinder bore 12a through the axial passage 46, the pressure release aperture 47, and the suction chamber 38. That is, when the inclination of the swash plate 23 is minimized, refrigerant gas circulates through the discharge chamber 39, the control passage 48, the crank chamber 15, the axial passage 46, the pressure release aperture 47, the suction chamber 38, and the cylinder bore 12a. During the circulation, lubricant contained in the refrigerant gas lubricates moving parts inside the compressor.

Figure 5:
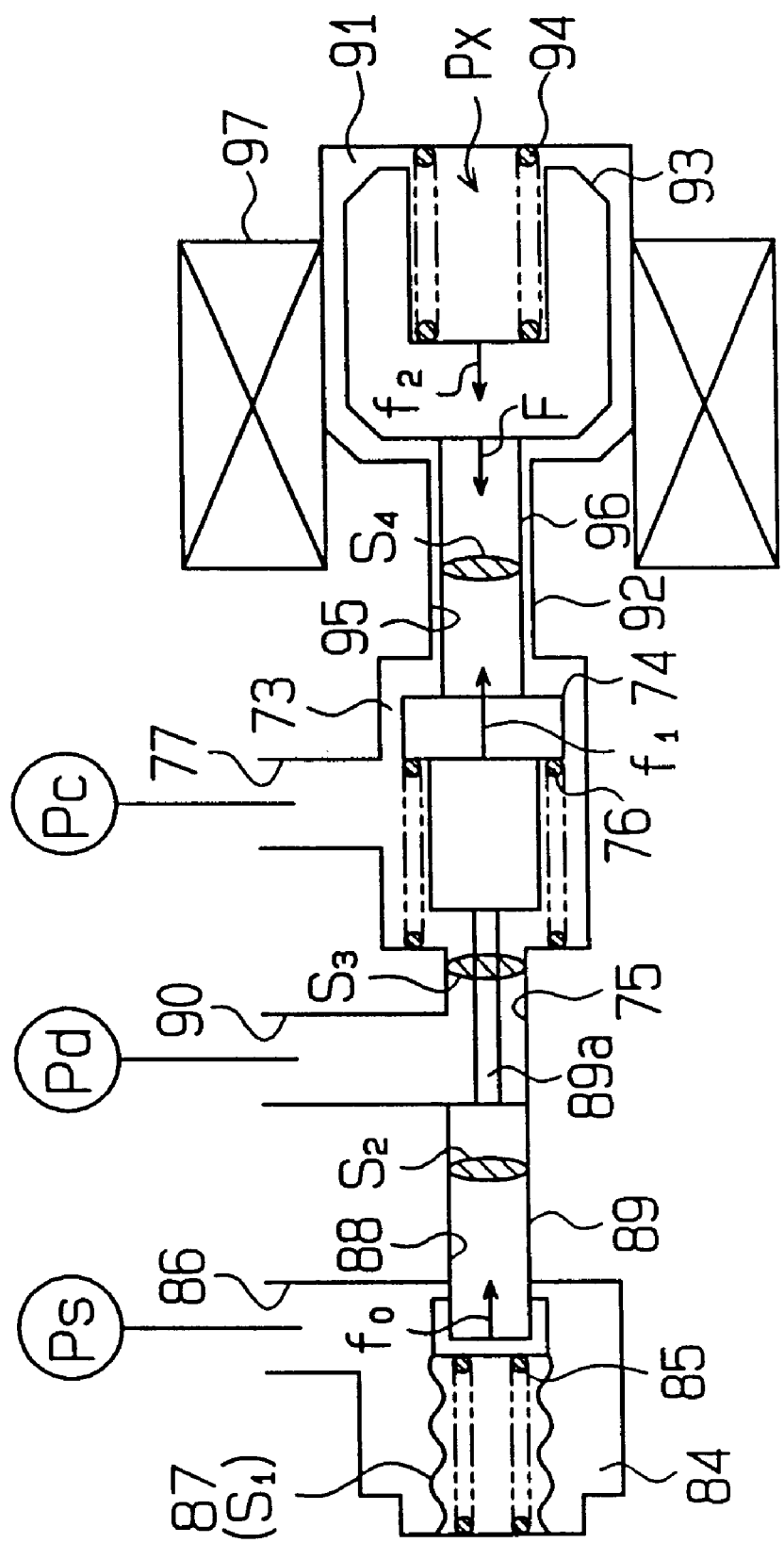
FIG. 5 is a diagram illustrating the forces acting on the valve body of FIG. 1.

The forces that are applied to the valve body 74 in the control valve 49 will now be described with reference to FIG. 5. The balance of the forces applied to the valve body 74 is represented by the following expression (1).

$$f_0 - S_1 * Ps - S_2(Pd-Ps) = -S_3(Pd-Pc) - S_4(Pc-Px) + F + f_2 f_1 \quad (1)$$

$S_1$ represents the pressurized area of the bellows 87.

$S_2$ represents the cross sectional area of the pressure sensitive rod 89.

$S_3$ represents the cross sectional area of the valve hole 75.

$S_4$ represents the cross sectional area of the solenoid rod 96.

F represents the electromagnetic attraction force generated by the passage of electric current in the coil 97.

$f_0$ represents the force of the bellows spring 85 and the force of the bellows 87.

$f_1$ represents the force of the opener spring 76.

$F_2$ represents the force of the follower spring 94.

Ps represents the suction pressure, or the pressure in the pressure sensitive chamber 84.

Pc represents the crank pressure, or the pressure in the valve chamber 73.

Pd represents tho discharge pressure, or the pressure in the valve hole 75.

Px represents the pressure in the plunger chamber 91.

The expression (1) is changed as follows.

$$f_0 - S_1 * Ps = Pd(S_2 - S_3) - S_2 * Ps + S_3 * Pc - S_4(Pc-Px) + F + f_2 - f_1 \quad (2)$$

As described, the cross sectional area $S_2$ is equal to the cross sectional area $S_3$ of the valve hole 75. Accordingly, the right side of the equation (2) will be $Pd(S_2-S_3)=0$. Also, the pressure Px of the plunger chamber 91 is equal to the crank pressure Pc. Accordingly, the right side of the equation (2) will be $-S_4(Pc-Px)=0$.

Since $S_3$ is replaced with $S_2$, $Pd(S_2-S_3)=0$ and $-S_4(Pc-Px)=0$ in the expression (2). The following expression (3) is therefore obtained.

$$f_0 - S_1 * Ps = -S_2 * Ps + S_2 * Pc + F + f_2 - f_1$$

$$Ps = (f_0 + f_1 - f_2 F - S_2 * Pc)/(S_1 - S_2) \quad (3)$$

Figure 7:
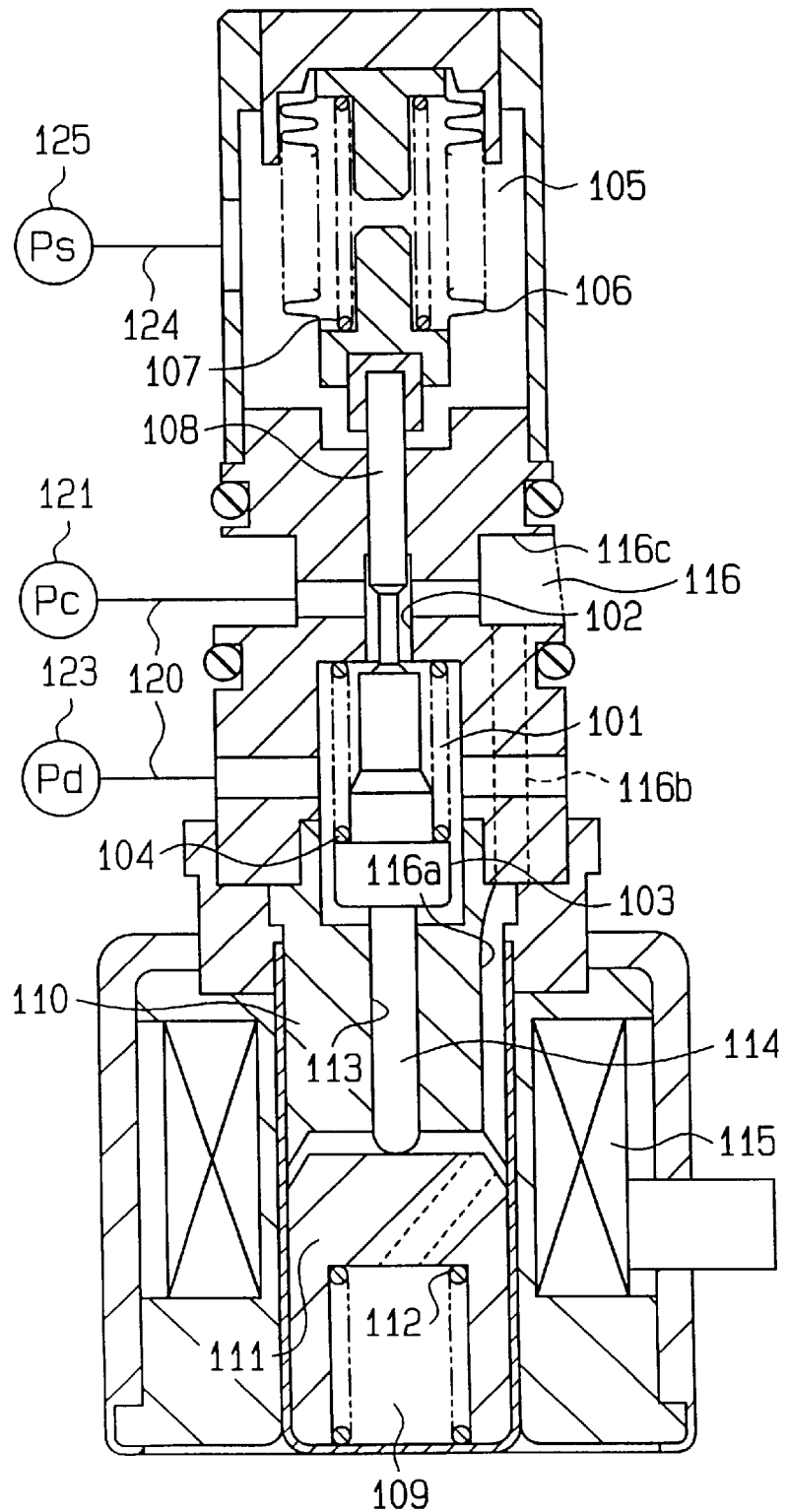
FIG. 7 is a cross sectional view illustrating a prior art control valve.
Figure 8:
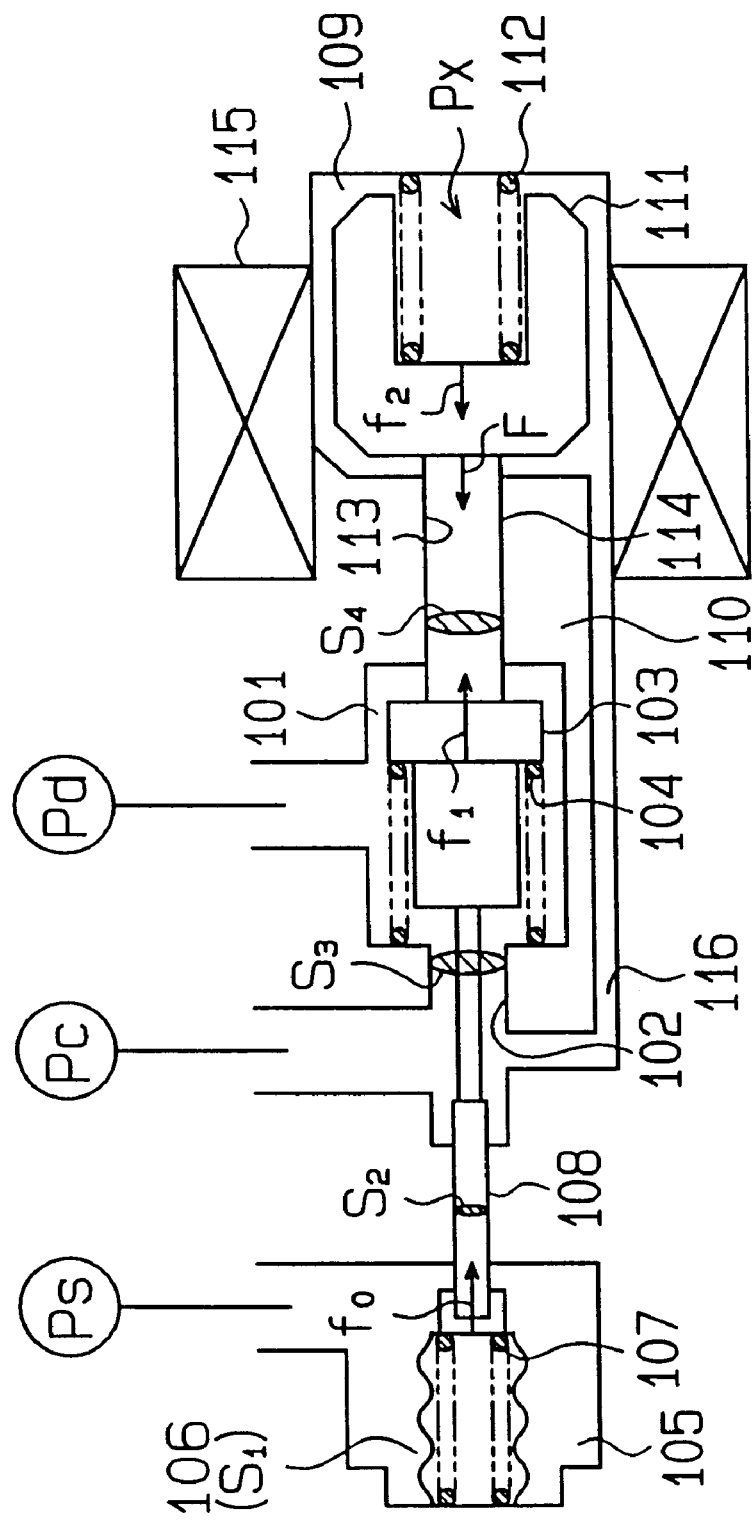
FIG. 8 is a diagram illustrating the forces acting on the valve body of FIG. 7.

The expression (3) is the same as an expression (12) showing the motion of the prior art control valve shown in FIG. 7. Accordingly, in the control valve 49 of the present invention, as in the control valve of FIG. 7, it is possible to remove the influence of the discharge pressure Pd and the crank pressure Pc on the valve body 74. Therefore, the control valve 49 controls the opening size of the valve hole 75 by the valve body 74 with precision. Also, the size of the solenoid 72 is reduced, which reduces the power requirements.

The valve chamber 73 and the plunger chamber 91, which are separated by the fixed iron core 92, are both exposed to the crank pressure Pc and are connected by the annular passage between the solenoid rod 96 and the guide hole 95 (FIG. 1A). This results in good control valve operation characteristics. Therefore, it is not necessary to seal the space between the solenoid rod 96 and the guide hole 95. In other words, precision is not required for manufacturing the solenoid rod 96 and the guide hole 95 to form a seal between the solenoid rod 96 and the guide hole 95. Also, there is no need for a passage for connecting the plunger chamber 91 to the crank chamber 15. This facilitates manufacturing the control valve 49 and reduces the manufacturing costs.

If the valve body 74 and the pressure sensitive rod 89 are independent parts, they may separate. Similarly, if the valve body 74 and the solenoid rod 96 are independent parts, they may separate. If the valve body 74 is separated from the rods 89, 96, the valve body 74 cannot precisely follow the changes of the force of solenoid 72 and the suction pressure Ps, and this unbalances the forces applied to the valve body 78. However, in the present invention, since the pressure sensitive rod 89 and the solenoid rod 96 are integrally formed, this problem does not occur and the valve body 74 operates properly and reliably. This reduces the number of parts in the control valve 49 and simplifies the structure.

The upper peripheral end surface 74a of the valve body 74 is planar. Therefore, even if the axis of the valve body is radially offset from the axes of the rods 89, 96, the valve body 74 positively closes the valve hole 75.

A tapered portion 74b is provided at the center of the end surface 74a of the valve body 74. When the valve body 74 opens and closes the valve hole 75, the tapered portion 74b gradually changes the cross sectional area of the gas passage from the valve hole 75 to the valve chamber 73. This prevents suddenly starting or stopping the supply of refrigerant gas to the crank chamber 15, thus stabilizing the displacement control operation of the compressor.

When the solenoid 72 is demagnetized, the opener spring 76 urges the valve body 74 to maximize the opening size of the valve hole 75. Accordingly, the compressor operates with minimum displacement when the solenoid 72 is demagnetized. Therefore, the control valve 49 of the present invention can be employed to a clutchless variable displacement compressor, which operates with minimum displacement when there is no cooling load on the compressor.

The present invention will further be embodied as follows.

Figure 6:
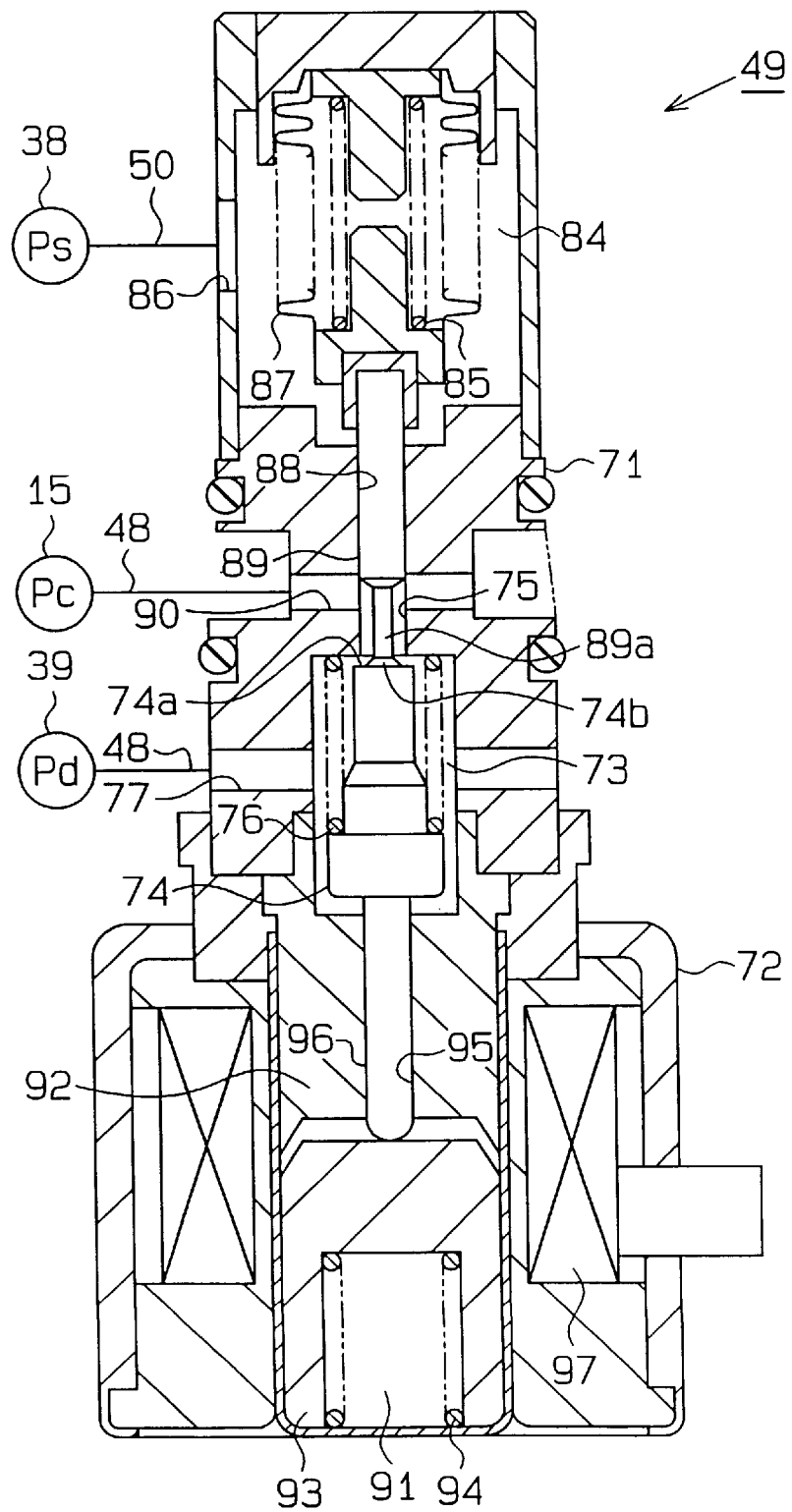
FIG. 6 is a cross sectional view showing a control valve according to a second embodiment.

Contrary to the embodiment of FIG. 1, as shown in FIG. 6, the valve hole 75 may be connected to the crank chamber 15 through the downstream section of the control passage 48, and the valve chamber 73 and the plunger chamber 91 may be connected to the discharge chamber 39 through the upstream section of the control passage 48.

A passage for connecting the plunger chamber 91 to the crank pressure zone (for example, the valve chamber 73, the outlet port 77, the downstream side of the control passage 48 or crank chamber 15) may be formed.

The control valve 49 of the present invention may be used for a clutch-type variable displacement compressor. Furthermore, the control valve 49 may be applied to fluid machines other than compressors.

Therefore, the present examples and embodiments are to be considered as illustrative and not restrictive and the invention is not to be limited to the details given herein, but may be modified within the scope and equivalence of the appended claims.

What is claimed is:

1. A control valve for adjusting the amount of fluid that flows from a high-pressure zone to a pressurized chamber through a fluid passage in accordance with an operating pressure applied to the control valve, the control valve comprising:
   a housing, the housing including a valve hole and a valve chamber, which are located in the fluid passage, wherein the valve hole communicates with the valve chamber when the valve is open;
   a movable valve body located in the valve chamber to face the valve hole;
   a reacting member for reacting to the operating pressure;
   a first rod located between the reacting member and the valve body for transmitting motion from the reacting member to the valve body;
   a solenoid located on the opposite side of the valve body from the reacting member, the solenoid including a plunger chamber and a movable plunger located in the plunger chamber;
   a second rod located between the plunger and the valve body, wherein the plunger urges the valve body in one direction through the second rod in accordance with electric current supplied to the solenoid; and
   wherein the valve chamber and the plunger chamber are exposed to the pressure of one of the high-pressure zone and the pressurized chamber, and the valve hole is exposed to the pressure of the other.

2. The control valve according to claim 2, wherein the first rod and the valve hole have substantially the same cross sectional area.

3. The control valve according to claim 1, wherein the plunger chamber and the valve chamber are exposed to the pressure of the pressurized chamber, and the valve hole is exposed to the pressure of the high-pressure zone.

4. The control valve according to claim 1, wherein the plunger chamber is connected to the fluid passage through the valve chamber.

5. The control valve according to claim 1, wherein a partition is formed between the valve chamber and the plunger chamber, the partition including a guide hole for receiving the second rod, wherein a space connecting the valve chamber to the plunger chamber exists between the guide hole and the second rod.

6. The control valve according to claim 1, wherein the first rod is integrally formed with the valve body.

7. The control valve according to claim 1, wherein the second rod is integrally formed with the valve body.

8. The control valve according to claim 1, wherein, as the operating pressure applied to the control valve increases, the reacting member permits the valve body to move toward the valve hole.

9. The control valve according to claim 8, wherein the plunger urges the valve body toward the valve hole through the second rod based on an electric current supplied to the solenoid.

10. The control valve according to claim 9 further including a spring for urging the valve body to move away from the valve hole, wherein the spring maximizes the opening size of the valve hole when the solenoid is demagnetized.

11. The control valve according to claim 1, wherein the valve body includes a planar end surface that abuts against a rim of the valve hole to close the valve hole.

12. The control valve according to claim 11, wherein a projection is formed on the planar end surface of the valve body to face the valve hole, the projection including a tapered surface, the diameter of which decreases as the distance from the planar end surface of the valve body increases.

13. A control valve for controlling the amount of fluid flowing in a fluid passage in accordance with an operating pressure applied to the control valve, wherein the fluid passage has an upstream section leading toward the control valve and a downstream section leading away from the control valve, the control valve comprising:

a housing, the housing including a valve hole and a valve chamber, which are located in the fluid passage, wherein the valve hole communicates with the valve chamber when the valve is open;

a movable valve body located in the valve chamber to face the valve hole to adjust an opening size of the valve hole;

a reacting member for reacting to the operating pressure;

a first rod, which extends from the valve body toward the reacting member, to transmit motion from the reacting member to the valve body;

a solenoid located on the opposite side of the valve body from the reacting member, the solenoid including a plunger chamber and a movable plunger located in the plunger chamber;

a second rod extending from the valve body to the plunger, wherein the plunger urges the valve body in one direction through the second rod by a force that is determined by the level of electric current supplied to the solenoid; and wherein both the valve chamber and the plunger chamber are connected to either the upstream section or the downstream section, and the valve hole is connected to the other.

14. The control valve according to claim 13, wherein the first rod and the valve hole have substantially the same cross sectional area.

15. The control valve according to claim 13, wherein the downstream section is connected to both the valve chamber and the plunger chamber, and the upstream section is connected to the valve hole.

16. The control valve according to claim 13, wherein a partition is formed between the valve chamber and the plunger chamber, the partition including a guide hole for receiving the second rod, wherein a space connecting the valve chamber to the plunger chamber exists between the guide hole and the second rod.

17. A control valve for controlling a displacement amount of a variable displacement compressor by adjusting the inclination angle of a drive plate located in a crank chamber, wherein the compressor includes a fluid passage for connecting a discharge chamber to the crank chamber, wherein the control valve adjusts the amount of gas flowing from the discharge chamber to the crank chamber through the fluid passage so that the inclination angle of the drive plate is adjusted by changing the pressure in the crank chamber, the control valve comprising:

a housing, the housing including a valve hole and a valve chamber, which are located in the fluid passage, wherein the valve hole communicates with the valve chamber when the valve is open;

a movable valve body located in the valve chamber to face the valve hole to adjust the opening size of the valve hole;

a reacting member for reacting to the pressure of gas supplied to the compressor;

a first rod located between the reacting member and the valve body to transmit movement of the reacting member to the valve body;

a solenoid located on the opposite side of the valve body from the reacting member, the solenoid including a plunger chamber and a movable plunger located in the plunger chamber;

a second rod located between the plunger and the valve body, wherein the plunger urges the valve body in one direction through the second rod in accordance with an electric current supplied to the solenoid; and wherein one of the discharge chamber and the crank chamber is connected to both the valve chamber and the plunger chamber, and the other is connected to the valve hole.

18. The control valve according to claim 17, wherein the first rod and the valve hole have substantially the same cross sectional area.

19. The control valve according to claim 17, wherein the crank chamber is connected to the valve chamber and the plunger chamber by a downstream section of the fluid passage, and the discharge chamber is connected to the valve hole through an upstream section of the fluid passage.

20. The control valve according to claim 17, wherein a partition is formed between the valve chamber and the plunger chamber, the partition including a guide hole for receiving the second rod, wherein a space connecting the valve chamber to the plunger chamber exists between the guide hole and the second rod.

* * * * *

UNITED STATES PATENT AND TRADEMARK OFFICE
CERTIFICATE OF CORRECTION

PATENT NO. : 6,062,824
DATED : May 16, 2000
INVENTOR(S) : Kazuya Kimura et al.

It is certified that error appears in the above-identified patent and that said Letters Patent is hereby corrected as shown below:

Column 6,
Line 44 please change "expansion valve,54 and" to -- expansion valve 54 and --;

Column 10,
Line 39 please change "$F+f_2f_1$" to -- $F+f_2-f_1$ --;
Line 56 please change "Pd represents tho discharge pressure," to -- Pd represents the discharge pressure, --;

Column 11,
Line 7 please change "$(f_0+f_1-f_2F-S_2*Pc)$" to --$(f_0+f_1-f_2-F-S_2*Pc)$ --.

Signed and Sealed this

Twenty-first Day of May, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.      : 6,062,824
DATED           : May 16, 2000
INVENTOR(S)     : Kazuya Kimura et al.

It is certified that error appears in the above-identified patent and that said Letters Patent is hereby corrected as shown below:

<u>Title page,</u>
Item [30], Foreign Application Priority Data, please delete "July 24, 1998" and insert therefor -- April 27, 1998 --.

Signed and Sealed this

Seventeenth Day of December, 2002

JAMES E. ROGAN
*Director of the United States Patent and Trademark Office*